US005815378A

United States Patent [19]

Nagai

[11] Patent Number: 5,815,378

[45] Date of Patent: Sep. 29, 1998

[54] FLYBACK TRANSFORMER

[75] Inventor: Tadao Nagai, Shiga-ken, Japan

[73] Assignee: Murata Manufacturing Co., Ltd., Nagaokakyo, Japan

[21] Appl. No.: 606,739

[22] Filed: Feb. 27, 1996

[30] Foreign Application Priority Data

Feb. 28, 1995 [JP] Japan .................................... 7-039733

[51] Int. Cl.$^{6}$ ........................................................ H02B 1/04

[52] U.S. Cl. ........................... 361/836; 336/150; 336/192

[58] Field of Search ..................................... 323/359, 358; 336/150, 192; 361/601, 623, 679, 752, 772–776, 780, 782, 783, 836

[56] References Cited

U.S. PATENT DOCUMENTS

| | | | |
|---|---|---|---|
| 4,156,888 | 5/1979 | Takahashi | 361/836 |
| 4,499,522 | 2/1985 | Nakamura | 361/836 |
| 5,160,872 | 11/1992 | Kenji et al. | 361/752 |
| 5,287,479 | 2/1994 | Masaru et al. | 361/836 |
| 5,546,280 | 8/1996 | Hasebe et al. | 361/836 |

FOREIGN PATENT DOCUMENTS

| | | |
|---|---|---|
| 0 324 084 | 7/1989 | European Pat. Off. . |
| 2 100 525 | 12/1982 | United Kingdom . |

OTHER PUBLICATIONS

*Electric Machinery*, Chapter 12, pp. 230–231, published in 1986.

*Primary Examiner*—Gregory P. Thompson
*Attorney, Agent, or Firm*—Burns, Doane, Swecker & Mathis, LLP

[57] ABSTRACT

A flyback transformer has a high-voltage bobbin. The bobbin is provided with a focus-pack connection terminal in addition to electronic-component mounting terminals. The focus-pack connection terminal is connected to one of the electronic-component mounting terminals which provides the desired high voltage. When the desired voltage changes, the focus-pack connection terminal is simply connected to another one of the electronic-component mounting terminals corresponding to the changed voltage, easily changing the focus-pack supply voltage.

10 Claims, 3 Drawing Sheets

*Fig. 1*
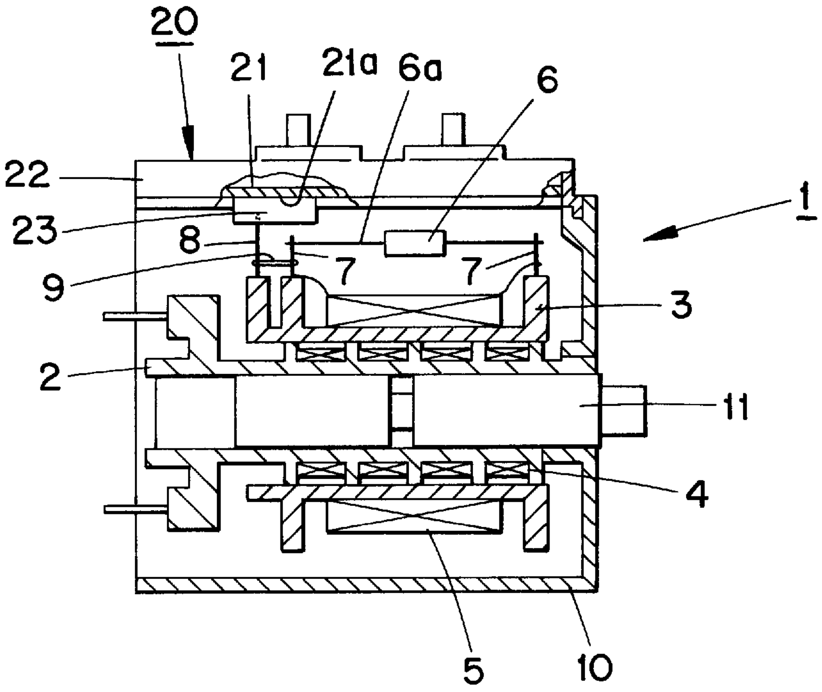
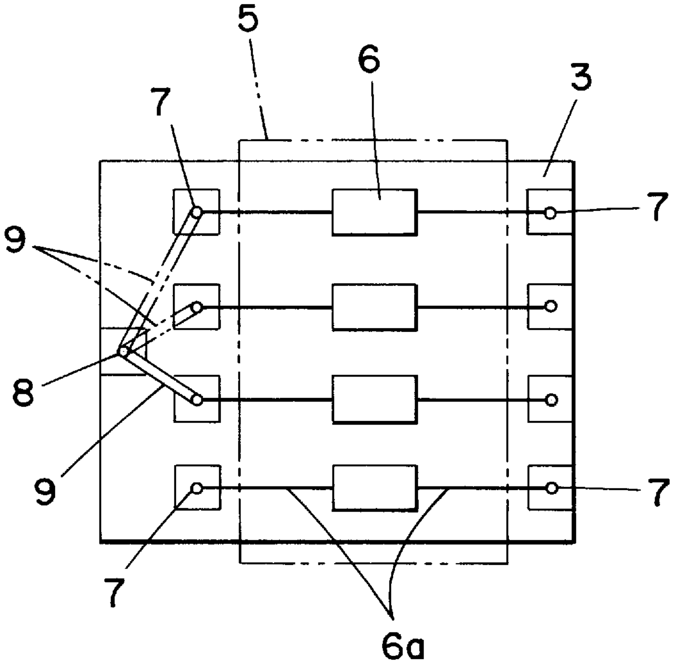
*Fig. 2*

Fig. 4
"PRIOR ART"
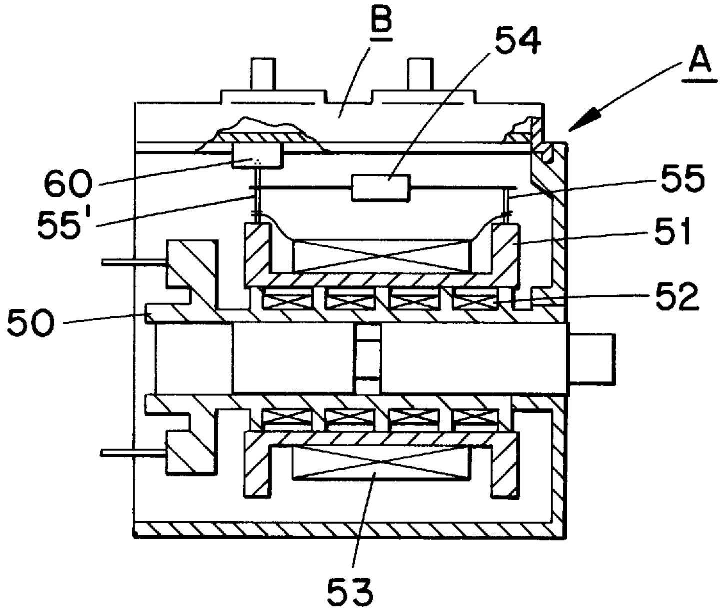
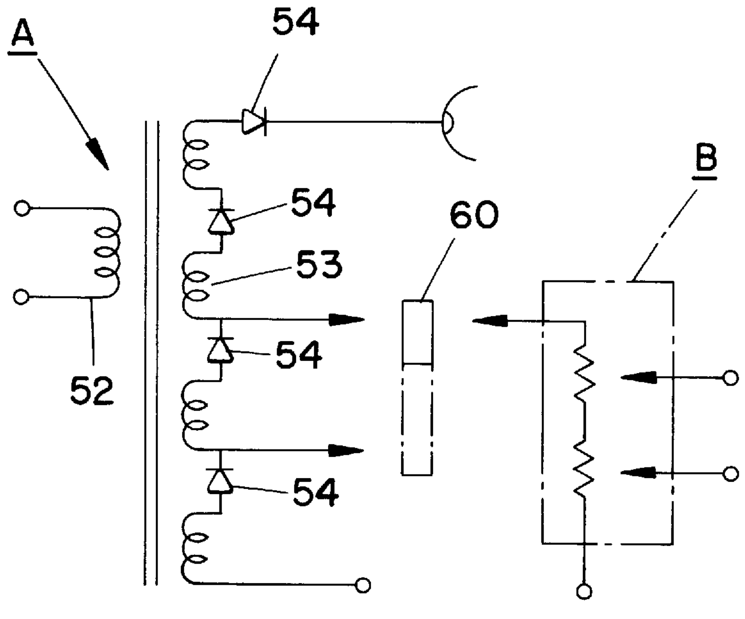
Fig. 5

FLYBACK TRANSFORMER

BACKGROUND OF THE INVENTION

1. Field of the Invention

The present invention relates to a flyback transformer for supplying high voltages to a cathode-ray tube.

2. Description of the Related Art

A flyback transformer "A" comprises a low-voltage bobbin 50 and a high-voltage bobbin 51 disposed around the low-voltage bobbin 50, with a low-voltage primary winding 52 and a high-voltage secondary winding 53 wound on the bobbins 50 and 51, respectively, as shown in FIGS. 4 and 5.

The high-voltage secondary winding 53 is divided into a plurality of portions, the divided portions being connected together in series through rectifier diodes 54. The rectifier diodes 54 are connected and secured to electronic-component mounting terminals 55 which are formed parallel to and on the high-voltage bobbin 51 in order to connect and secure the rectifier diodes 54.

A high voltage output from the flyback transformer "A" is directly supplied to a cathode-ray tube. In addition, the high voltage from one of the coil portions of the secondary winding 53 is input to a focus pack "B", adjusted therein, and then supplied to the cathode-ray tube as a focus voltage.

Conventionally, the flyback transformer "A" and the focus pack "B" have been connected in the following way. The electronic-component mounting terminal 55' corresponding to the connection point where a focus-pack supply voltage is formed as one of connection points in the secondary winding 53 and is formed to be slightly longer than other electronic-component mounting terminals 55. Electrically conductive rubber 60 serving as a connection terminal for the focus pack "B" is mounted to oppose the long electronic-component mounting terminal 55'. The flyback transformer "A" and the focus pack "B" are connected by mounting the focus pack "B" to the flyback transformer "A" to stick the long electronic-component mounting terminal 55' into the electrically conductive rubber 60.

In recent cathode-ray tubes, the ratio of focus voltage to high voltage (focus voltage/high voltage) differs depending on the manufacture of the cathode-ray tube and the focus voltage differs depending on the size or model of a cathode-ray tube even when made by the same manufacture. To respond to such variations in the focus voltage requirements, it becomes necessary to change the voltage which the flyback transformer "A" supplies to the focus pack "B". In the conventional flyback transformer "A", the position of the long electronic-component mounting terminal 55', which serves as a terminal for taking out the focus-pack supply voltage, is changed in order to vary the voltage taken out of the high-voltage secondary winding 53, responding to variation in the focus voltage.

Even in a flyback transformer in which such a countermeasure has been taken against variation in the focus voltage, the following problems remain.

The position of the long electronic-component mounting terminal 55' sticking in the electrically conductive rubber of the focus pack "B" needs to be changed according to the focus-pack supply voltage. This means that various high-voltage bobbins 51 having the long electronic-component mounting terminal 55' at different positions have to be prepared according to various focus-pack supply voltages, increasing both the manufacturing cost and stock requirements.

Furthermore, to accommodate the various possible position changes of the long electronic-component mounting terminal 55', the size of the electrically conductive rubber 60 disposed at the focus pack "B" needs to be enlarged, increasing the manufacturing cost of the focus pack "B".

The output voltage of the focus pack "B" can be changed by varying the resistance of a resistor pattern formed on a printed circuit board of the focus-pack "B" according to voltage variation. Then, the flyback transformer "A" does not need to accommodate voltage variations. In this case, however, a plurality of printed circuit boards on which resistor patterns having different resistances have to be prepared, increasing the manufacturing cost of the focus pack "B" and its stock requirements.

SUMMARY OF THE INVENTION

Accordingly, it is an object of the present invention to provide a flyback transformer which can change the focus-pack supply voltage without increasing the manufacturing cost.

The foregoing object is achieved through the provision of a flyback transformer having a focus-pack connection terminal on a high-voltage bobbin in addition to electronic-component mounting terminals.

By connecting the specified electronic-component mounting terminal to the focus-pack connection terminal and then connecting the focus-pack connection terminal to the focus pack, a high voltage can be supplied from the flyback transformer to the focus pack.

Since the focus-pack connection terminal is provided at a fixed position on the high-voltage bobbin, the connection position between the flyback transformer and the focus pack does not change.

When the focus voltage is changed, the focus-pack connection terminal is connected to another electronic-component mounting terminal accordingly.

BRIEF DESCRIPTION OF THE DRAWINGS

FIG. 1 is a cross section showing the structure of a flyback transformer according to an embodiment of the present invention.

FIG. 2 is a plan view of the main portions of the embodiment.

FIG. 4 is a cross section of a conventional flyback transformer.

FIG. 5 is an equivalent circuit diagram of the flyback transformer and the focus pack according to the present invention.

DETAILED DESCRIPTION OF THE PREFERRED EMBODIMENT

Figure 3A:
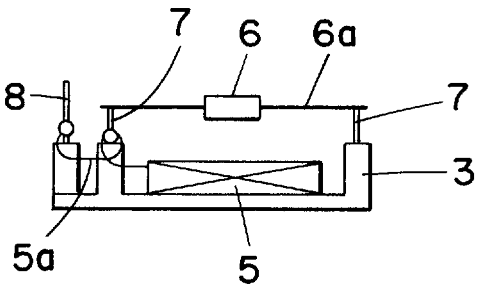
FIGS. 3(*a*), 3(*b*), 3(*c*), and 3(*d*) are cross sections of the main sections showing modified examples of the present invention.
Figure 3B:
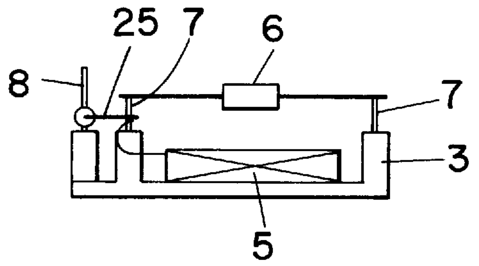
Figure 3C:
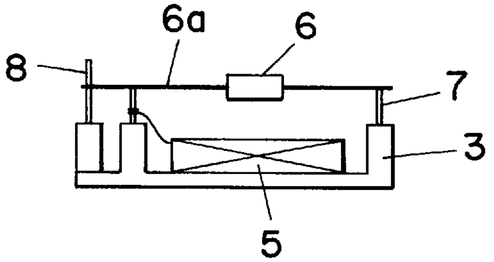
Figure 3D:
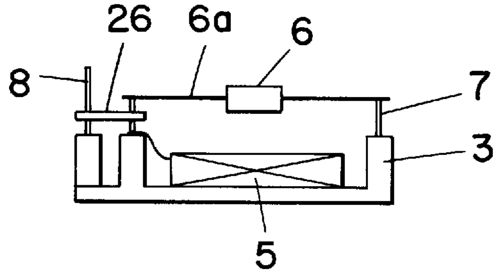

A preferred embodiment of a flyback transformer according to the present invention will be described in detail below by referring to the drawings.

A flyback transformer 1 comprises a low-voltage bobbin 2 and a high-voltage bobbin 3 disposed around the outside of the low-voltage bobbin 2, with a low-voltage primary winding 4 and a high-voltage secondary winding 5 wound on the bobbins 2 and 3, respectively, as shown in FIGS. 1 and 2. The high-voltage secondary winding 5 is divided into a plurality of portions, each of which is connected to another in series through rectifier diodes 6. The rectifier diodes 6 are connected and secured to electronic-component mounting terminals 7 which protrude from the high-voltage bobbin 3. The electronic-component mounting terminals 7 are disposed on the circumferential end surface of the high-voltage bobbin 3 at both ends of the bobbin 3 in the bobbin's axial direction so that the high-voltage secondary winding 5 is located between the terminals 7, in order to connect each of the divided portions of the high-voltage secondary winding 5 sequentially in series. The electronic-component mounting terminals 7 provided at both ends of the bobbin in the bobbin-axis direction are disposed in parallel in the radial direction of the high-voltage bobbin 3. The rectifier diodes 6 are disposed such that they are suspended over the high-voltage secondary winding 5 by connecting their leads 6*a* to the corresponding electronic-component mounting terminals 7 disposed at both ends of the high-voltage secondary winding 5. Each of the divided portions of the high-voltage secondary winding 5 is connected to the corresponding electronic-component mounting terminals 7 at its end by soldering. Through the rectifier diodes 6, the divided portions are connected to each other in series.

The high-voltage bobbin 3 has a focus-pack connection terminal 8 in addition to the electronic-component mounting terminals 7. The focus-pack connection terminal 8 is disposed at one end of the high-voltage bobbin 3 in the axial direction, which is positioned on a side of the electronic-component mounting terminals 7 opposite to the diodes 6 in the axial direction of the bobbin 3. The focus-pack connection terminal 8 is slightly longer than the electronic-component mounting terminals 7 and disposed at a location central to the electronic-component mounting terminals 7 arranged in parallel (in the radial direction of the high-voltage bobbin). The focus-pack connection terminal 8, disposed as described above, is connected with a jumper 9 to the electronic-component mounting terminal 7 corresponding to the divided portion of the high-voltage secondary winding 5 which generates the appropriate focus-pack supply voltage among the electronic-component mounting terminals 7. The jumper 9 is connected by soldering. It may be connected by welding, crimping, or other methods. The flyback transformer 1, thus configured, is housed in a case 10. A core 11 shown in FIG. 1 is mounted to the flyback transformer 1.

A focus pack 20 to be connected to the flyback transformer 1 is configured such that a printed circuit board 21 having resistor patterns (not shown) is put on the inner circumferential part of a case 22. On a surface 21*a* of the printed circuit board 21 facing the flyback transformer 1, electrically conductive rubber 23 serving as a connection terminal to the flyback transformer 1 is mounted. The electrically conductive rubber 23 is connected to the resistor patterns provided on the printed circuit board 21. The rubber 23 is disposed at a position opposite to the focus-pack connection terminal 8.

The focus pack 20 is mounted to the flyback transformer 1 by fitting the focus pack 20 into the opening in the case 10. The focus-pack connection terminal 8, which is longer than the electronic-component mounting terminals 7, is stuck into the electrically conductive rubber 23, electrically connecting the focus pack 20 to the flyback transformer 1.

When a current is supplied to the flyback transformer 1 with the focus pack 20 being connected, the desired high voltage is supplied to the focus pack 20 from the flyback transformer 1 through the focus-pack connection terminal 8.

To change the focus-pack supply voltage output from the flyback transformer 1, the focus-pack connection terminal 8 is simply connected to another of the electronic-component mounting terminals 7 with the jumper 9. This work is easily accomplished and, in addition, there is no need to change the basic structure of the flyback transformer 1.

Since the focus-pack connection terminal 8 is disposed at the center place of the electronic-component mounting terminals 7 arranged in parallel (in the circumferential direction of the high-voltage bobbin), a relatively short jumper can serve as the jumper 9, the connection is simple, and there is no possibility of a short-circuit because a distance required to assure the dielectric strength is obtained even if the connection point is changed.

Moreover, when the focus-pack supply voltage is changed, the position of the connection point (i.e., the focus-pack connection terminal 8) of the flyback transformer 1 to the focus pack 20 is not changed. Therefore, the size or the position of the electrically conductive rubber 23 does not need to be changed in the focus pack 20.

In the foregoing embodiment, the focus-pack connection terminal 8 and the electronic-component mounting terminal 7 (high-voltage secondary winding 5) are connected by soldering the jumper 9. As shown in FIG. 3(a), they may be connected by soldering an end 5*a* of the high-voltage secondary winding 5 to the corresponding electronic-component mounting terminal 7, and then connecting the tip of the end 5*a* to the focus-pack connection terminal 8.

The focus-pack connection terminal 8 and the electronic-component mounting terminal 7 (high-voltage secondary winding 5) may be connected by winding wire 25 which is other than the high-voltage secondary winding 5 around the focus-pack connection terminal 8 and the electronic-component mounting terminal 7, and soldering the wire 25 to the electronic-component mounting terminal 7 and to the focus-pack connection terminal 8, as shown in FIG. 3(*b*).

Further, they may be connected as shown in FIG. 3(*c*) by extending a lead 6*a* of a rectifier diode 6 to the focus-pack connection terminal 8 and soldering the lead 6*a* to the terminal 8.

Furthermore, as shown in FIG. 3(*d*), they may be connected by sticking the focus-pack connection terminal 8 and the electronic-component mounting terminal 7 to a board-like or planar electrically conductive rubber connector 26 at its both ends.

As described above, according to the present invention, since variation in the focus-pack supply voltage can be handled with one type of a high-voltage bobbin, the manufacturing time and cost can be reduced.

In addition, the focus pack does not need to be changed in terms of the basic structure for connecting to the flyback transformer, thus reducing the manufacturing time and cost of the focus pack.

What is claimed is:

1. A flyback transformer comprising:

a primary winding;

a high voltage bobbin provided with a plurality of electronic-component mounting terminals and adjacent to said primary winding;

a high-voltage secondary winding, which is divided into a plurality of portions, wound on said high-voltage bobbin, said divided portions of said high-voltage secondary winding being connected to each other through electronic components mounted to said electronic-component mounting terminals;

an additional connection terminal provided on said electronic-component mounting terminals; and connection means for selectively connecting one of said electronic-component mounting terminals to said additional connection terminal.

2. A flyback transformer according to claim 1, wherein said additional connection terminal is longer than said plurality of electronic-component mounting terminals.

3. A flyback transformer according to claim 1, wherein said additional connection terminal is located centrally to said plurality of electronic-component mounting terminals.

4. A flyback transformer according to claim 1, wherein said connection means is an end of said high-voltage secondary winding.

5. A flyback transformer according to claim 1, wherein said connection means is a winding wire other than said high-voltage secondary winding.

6. A flyback transformer according to claim 1, wherein said connection means is a lead wire of one of said electronic components.

7. A flyback transformer according to claim 1, wherein said connection means is a planar electrically conductive rubber connector.

8. A flyback transformer according to claim 1, wherein said additional connection terminal is arranged to be inserted into an electrically conductive rubber terminal of a focus pack when a focus pack is mounted on said flyback transformer.

9. A flyback transformer according to claim 1, further comprising a case housing said high voltage bobbin, said high-voltage secondary winding, said additional connection terminal, said plurality of electronic-component mounting terminals and said electronic components.

10. A flyback transformer according to claim 9, wherein said case includes a mounting opening for mounting said focus-pack.

* * * * *